United States Patent
Stever et al.

(10) Patent No.: US 11,108,274 B2
(45) Date of Patent: *Aug. 31, 2021

(54) SYSTEM AND METHOD FOR WIRELESS AED DOCKING

(71) Applicant: ZOLL Medical Corporation, Chelmsford, MA (US)

(72) Inventors: Timothy F Stever, Lowell, MA (US); Annemarie E Silver, Bedford, MA (US); Melissa M Dascoli, Wakefield, MA (US)

(73) Assignee: ZOLL Medical Corporation, Chelmsford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/947,170

(22) Filed: Jul. 21, 2020

(65) Prior Publication Data
US 2021/0075268 A1    Mar. 11, 2021

Related U.S. Application Data

(63) Continuation of application No. 16/377,299, filed on Apr. 8, 2019, now Pat. No. 10,763,703, which is a
(Continued)

(51) Int. Cl.
*H02J 50/20* (2016.01)
*H02J 50/80* (2016.01)
(Continued)

(52) U.S. Cl.
CPC .............. *H02J 50/20* (2016.02); *H02J 50/80* (2016.02); *H04Q 9/00* (2013.01); *H02J 7/00034* (2020.01);
(Continued)

(58) Field of Classification Search
CPC .......... H02J 50/20; H02J 50/80; H02J 7/0034; H04Q 9/00; H04Q 2209/86; H04Q 2209/883
See application file for complete search history.

(56) References Cited

U.S. PATENT DOCUMENTS 9,768,644 B2    9/2017  Stever et al.
10,090,716 B2  10/2018  Stever et al.
(Continued)

OTHER PUBLICATIONS

International Search Report and Written Opinion, PCT/US2014/031976, dated Sep. 4, 2014, 6 pages.

*Primary Examiner* — Amine Benlagsir
(74) *Attorney, Agent, or Firm* — ZOLL Medical Corporation

(57) ABSTRACT

According to an embodiment of the present invention, a system comprises a removable interface module and wireless dock for an automated external defibrillator. The removable interface module includes a first processor, a first memory and first low-power radio transceiver communicatively coupled with the first processor and configured to receive status information from the automated external defibrillator. The removable interface module further includes a wireless power receiver and a rechargeable energy storage device electrically coupled with the wireless power receiver and configured to receive power wirelessly for the removable interface module. The wireless dock includes a second processor, a second memory and second low-power radio transceiver communicatively coupled with the second processor and configured to receive the status information from the removable interface module when the automated external defibrillator is powered off and transmit the status information through a networking interface. The wireless dock further comprises a wireless power transmitter.

30 Claims, 4 Drawing Sheets

Related U.S. Application Data continuation of application No. 16/112,978, filed on Aug. 27, 2018, now Pat. No. 10,298,072, which is a continuation of application No. 15/674,571, filed on Aug. 11, 2017, now Pat. No. 10,090,716, which is a continuation of application No. 14/227,197, filed on Mar. 27, 2014, now Pat. No. 9,768,644.

(60) Provisional application No. 61/806,526, filed on Mar. 29, 2013.

(51) Int. Cl.
*H04Q 9/00* (2006.01)
*H02J 7/00* (2006.01)

(52) U.S. Cl.
CPC ... *H04Q 2209/86* (2013.01); *H04Q 2209/883* (2013.01)

(56) References Cited

U.S. PATENT DOCUMENTS

| | | | | |
|---|---|---|---|---|
| 2002/0032470 A1* | 3/2002 | Linberg | ................... | G06F 8/65 607/60 |
| 2003/0025602 A1* | 2/2003 | Medema | ................ | G16H 40/20 340/568.1 |
| 2003/0028219 A1* | 2/2003 | Powers | ................ | A61N 1/3904 607/5 |
| 2003/0212438 A1* | 11/2003 | Nova | ..................... | G16H 40/40 607/30 |
| 2009/0112274 A1* | 4/2009 | Herbert | ................ | A61N 1/3904 607/5 |
| 2009/0264948 A1* | 10/2009 | Tamura | ................... | H02J 50/10 607/5 |
| 2009/0264968 A1 | 10/2009 | Green | | |
| 2010/0076507 A1* | 3/2010 | Jones | ....................... | F03G 5/06 607/2 |
| 2011/0060378 A1* | 3/2011 | Tuysserkani | ......... | A61B 5/0022 607/5 |
| 2012/0150247 A1* | 6/2012 | Meier | ................ | H01M 10/425 607/5 |
| 2013/0304147 A1* | 11/2013 | Aoyama | ................ | G16H 40/63 607/6 |
| 2014/0232201 A1* | 8/2014 | Staring | ................... | H02J 50/60 307/104 |
| 2014/0292534 A1* | 10/2014 | Stever | ..................... | H04Q 9/00 340/870.07 |
| 2018/0026480 A1* | 1/2018 | Stever | .................... | H02J 7/025 340/870.07 |

* cited by examiner

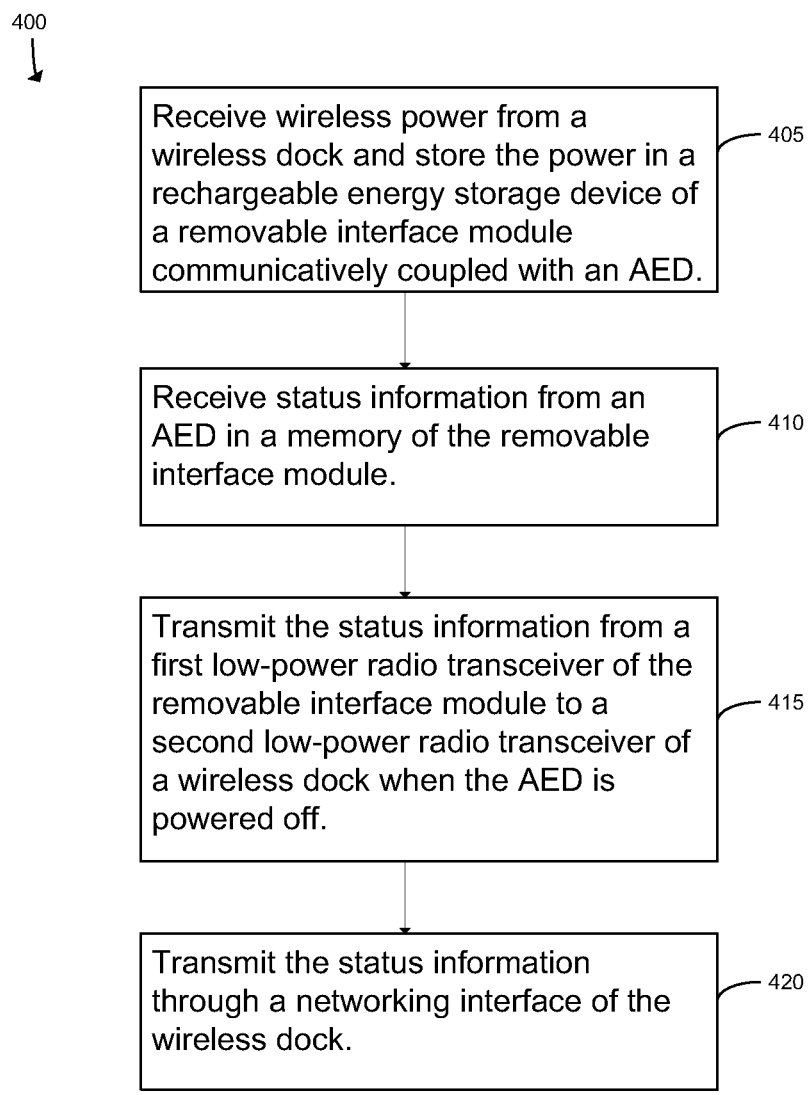

SYSTEM AND METHOD FOR WIRELESS AED DOCKING

CLAIM OF PRIORITY

This application claims priority under 35 USC § 119(e) to U.S. Patent Application Ser. No. 61/806,526, filed on Mar. 29, 2013, the entire contents of which are hereby incorporated by reference.

TECHNICAL FIELD

The invention relates generally to a system and method for wirelessly docking an automated external defibrillator (AED).

BACKGROUND

Sudden health problems such as sudden cardiac arrest and injuries caused by accidents kill thousands of people and cause permanent injury every year. Fast and competent care to resuscitate such victims of these problems can be essential to positive outcomes in such situations. For example, it is said that the chance of surviving a sudden cardiac arrest falls by ten percent for every minute of delay in providing effective treatment.

Resuscitation treatments for patients suffering from cardiac arrest generally include clearing and opening the patient's airway, providing rescue breathing for the patient, and applying chest compressions to provide blood flow to the victim's heart, brain, and other vital organs. If the patient has a shockable heart rhythm (ventricular fibrillation or pulseless ventricular tachycardia), resuscitation also may include defibrillation therapy using an AED, for example. Along with such action, an electrocardiogram (ECG) signal for the patient may be electronically captured, displayed, and monitored, so that rescuers can determine when the patient's heart has returned to normal or near-normal operation, and determine when the heart exhibits a shockable rhythm. About half of patients who suffer ventricular fibrillation (VF) have a recurrence of VF within minutes of successful VF conversion, which may then require reconversion. Patient odds of survival fall with repeated VF recurrence during resuscitation.

Survivability of a cardiac arrest patient may often depend on the availability of an AED in good working condition. Like any sophisticated electronic device, an AED requires periodic servicing to ensure it will be ready and available in the event of an emergency. Prompt AED servicing may depend on the length of time it takes to determine when an AED requires servicing, the type of servicing that is required and scheduling of personnel to provide the service for the AED.

SUMMARY

An example of a system according to the disclosure comprises a removable interface module for an automated external defibrillator, comprising: a first processor; a first memory and first low-power radio transceiver communicatively coupled with the first processor and configured to receive status information from the automated external defibrillator; a wireless power receiver; and a rechargeable energy storage device electrically coupled with the wireless power receiver and configured to receive power wirelessly for the removable interface module; and a wireless dock for an automated external defibrillator, comprising: a second processor; a second memory and second low-power radio transceiver communicatively coupled with the second processor and configured to receive the status information from the removable interface module when the automated external defibrillator is powered off and transmit the status information through a networking interface; and a wireless power transmitter configured to be coupled with a power source and transmit power wirelessly to the removable interface module when the removable interface module is within range.

In an example of the system discussed above, the first processor and first memory are configured to receive status information from the automated external defibrillator without the removable interface module utilizing power from the automated external defibrillator.

In an example of the system discussed above, the wireless power receiver is configured to receive power wirelessly from the wireless power transmitter and store the power in the rechargeable energy storage device when the automated external defibrillator is powered off.

In an example of the system discussed above, the wireless dock is powered by at least one of an A/C power source, Ethernet cable and battery.

In an example of the system discussed above, the networking interface is one of a wired networking interface and wireless networking interface.

In an example of the system discussed above, the status information comprises self-test diagnostic results of the automated external defibrillator.

In an example of the system discussed above, the status information comprises at least one electrode expiration date.

In an example of the system discussed above, the status information comprises an amount of energy delivered during a self-test shock by the automated external defibrillator.

In an example of the system discussed above, the status information comprises information related to at least one code event.

In an example of the system discussed above, the second processor and second memory are configured to transmit the status information to one of a data center and network management station.

In an example of the system discussed above, the second processor and second memory are configured to cause the removable interface module to power-on.

In an example of the system discussed above, the first processor and first memory are configured to receive software for the automated external defibrillator from the wireless dock.

An example of a method according to the disclosure comprises receiving power wirelessly from a wireless dock and storing the power in a rechargeable energy storage device of a removable interface module communicatively coupled with an automated external defibrillator; receiving status information from an automated external defibrillator in a first memory of the removable interface module; transmitting the status information from a first low-power radio transceiver of the removable interface module to a second low-power radio transceiver of a wireless dock when the automated external defibrillator is powered off; and transmitting the status information through a networking interface of the wireless dock.

In an example of the method discussed above, the receiving status information from an automated external defibrillator occurs without utilizing power from the automated external defibrillator.

In an example of the method discussed above, the receiving power wirelessly from a wireless dock and storing the power in a rechargeable energy storage device occurs when the automated external defibrillator is powered off and within range of the wireless dock.

In an example of the method discussed above the wireless dock is powered by at least one of an A/C power source, an Ethernet cable and battery.

In an example of the method discussed above, the networking interface is one of a wired networking interface and wireless networking interface.

In an example of the method discussed above, the status information comprises self-test diagnostic results of an automated external defibrillator.

In an example of the method discussed above, the status information comprises at least one electrode expiration date.

In an example of the method discussed above, the status information comprises an amount of energy delivered during a self-test shock.

In an example of the method discussed above, the status information comprises information related to at least one code event.

In an example of the method discussed above, the method comprises transmitting the status information through the networking interface to one of a data center and network management station.

In an example of the method discussed above, the method comprises causing the removable interface module to power on by transmitting a signal from the wireless dock.

In an example of the method discussed above, the removable interface module is configured to receive software for the automated external defibrillator from the wireless dock.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 4 is a flow diagram depicting a method according to an example embodiment of the invention.

DETAILED DESCRIPTION

Figure 1A:
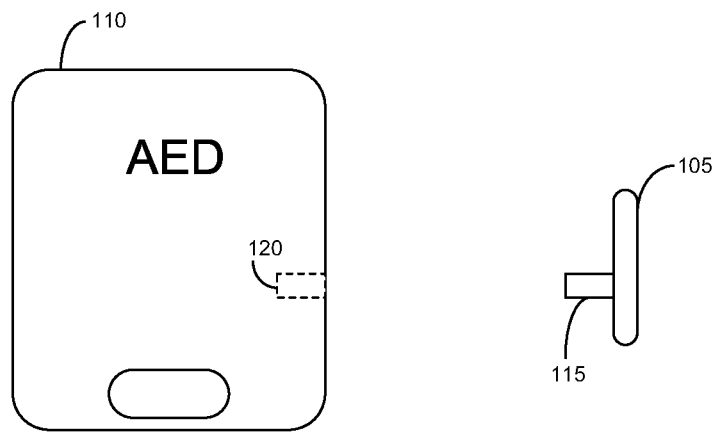
FIG. 1a is a diagram showing an interface module and an AED according to an embodiment of the invention.

FIG. 1a is a diagram showing an interface module 105 and an AED 110 according to an embodiment of the invention. AED 110 may be any type of automated external defibrillator from any manufacturer with a capability of communicating status information to an interface module such as interface module 105. For example, AED 110 may be the AED Plus® or AED Pro® manufactured by ZOLL Medical Corporation of Chelmsford, Mass. Status information may be any type of information or data related to an AED and/or accessories such as but not limited to configuration information, diagnostic information, troubleshooting/repair information, usage information, patient information, location information, code event information and/or the like. For example, status information may comprise self-test diagnostic results of the AED, at least one electrode expiration date, an amount of energy delivered during a self-test shock delivered by an AED or information related to at least one code event.

In some embodiments, an interface module may be completely embedded within an AED and non-removable. For example, an interface module may be permanently affixed directly on the AED's motherboard and contained within the chassis of the AED.

In some embodiments, an interface module may be embedded within an AED and removable. In some embodiments, an interface module such as interface module 105 may be disposed at least partially external to an AED and removable. For example, an interface module may be a removable interface module such as interface module 105 and capable of electrically and physically coupling and decoupling with AED 110.

Interface module 105 may include a serial data interface, parallel data interface, Universal Serial Bus (USB) interface and/or like data interface including a connector such as connector 115 to enable communication of data with an AED and to stay physically coupled and electrically connected with the AED especially while the AED is being transported. Further, an AED such as AED 110 may comprise a slot such as slot 120 configured to receive connector 115 and allow interface module to reliably, electrically and physically couple with AED 110. Other means may be employed to reliably couple an interface module to an AED such as using at least one screw, bolt or other fastener(s), for example, such as screws 216 of FIG. 3.

If interface module connector 115 is a USB connector, the USB connector itself may under certain conditions provide a means reliable and secure enough to ensure the external interface module 105 stays electrically and physically connected with an AED. In other situations, a USB connector may need to be further secured to the AED with a more secure and reliable means such as screws 216.

Figure 1B:
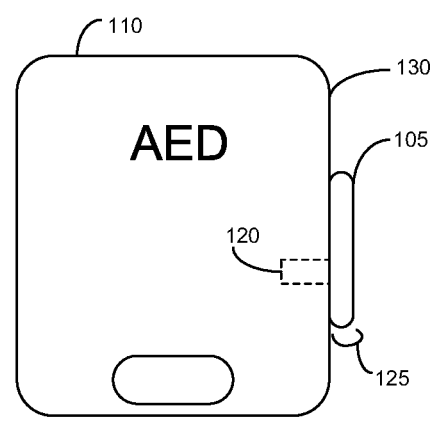
FIG. 1b is a diagram showing an interface module electrically and physically coupled with an AED according to an embodiment of the invention.

FIG. 1b is a diagram showing an interface module 105 electrically and physically coupled with AED 110 according to an embodiment of the invention. In the embodiment, removable interface module 105 has been inserted into AED 110 with at least a portion 125 of interface module 105 protruding beyond edge 130 of AED 110. In some embodiments, a removable interface module may be fully inserted into AED 110 such that there are no external, protruding portions.

Figure 2A:
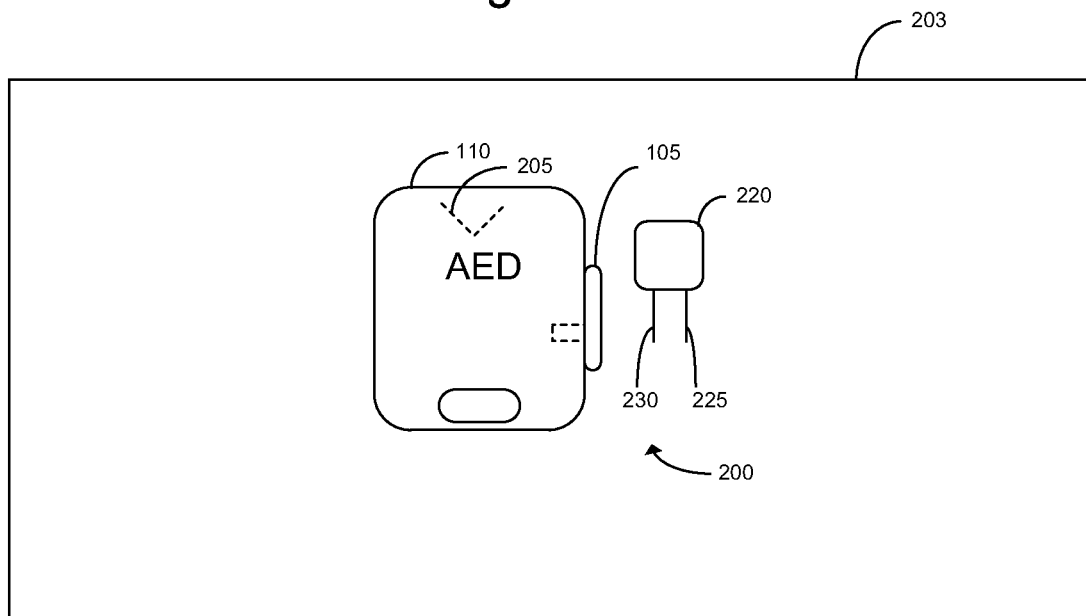
FIG. 2a is a diagram showing a system comprising a removable interface module electrically and physically coupled with an AED and a wireless dock mounted on a wall according to an embodiment of the invention.
Figure 2B:
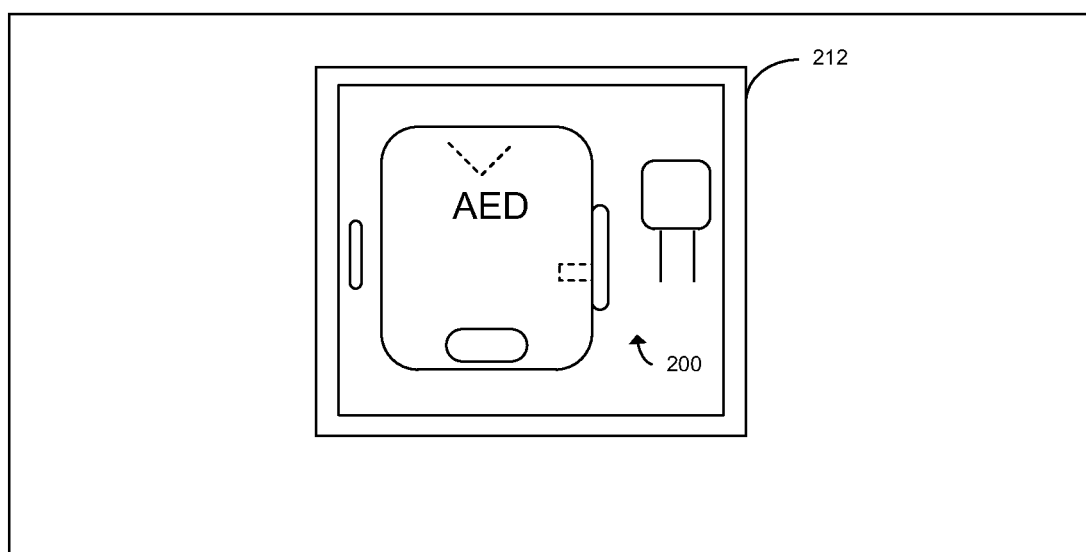
FIG. 2b is a diagram showing the system of FIG. 2a mounted in a wall cabinet according to an embodiment of the invention.

FIG. 2a is a diagram showing a system 200 comprising a removable interface module 105 electrically and physically coupled with an AED 110 and a wireless dock 220 mounted on a wall 203 according to an embodiment of the invention. FIG. 2b is a diagram showing the system 200 of FIG. 2a mounted in a wall cabinet according to an embodiment of the invention.

In some embodiments, AED 110 may be powered off or in a sleep mode, ready to be used and mounted directly on wall 203 or within an AED cabinet 212, for example, using a mounting or hanging means such as a mounting hook 205. Wireless dock 220 may be mounted on wall 203 adjacent to AED 110 or behind AED 110. In some embodiments, a wireless dock may be coupled with or integrated into at least part of an AED cabinet such as AED cabinet 212. In some embodiments, wireless dock 220 along with AED 110 and interface module 105 are portable. For example, wireless dock 220 and AED 110 including interface module 105 may be stored together in a case, bag or other container, which may be carried by a user or located in a vehicle.

In any case, wireless dock 220 may be located proximate to AED 110 so wireless dock 220 may communicate information wirelessly with interface module 105 and so wireless dock 220 may supply power wirelessly to interface module 105. A "wireless" dock refers to a dock's ability to wirelessly communicate data with and/or deliver power to an AED interface module even though wireless dock may include wires such as a power cord and/or Ethernet cable, for example.

Figure 3:
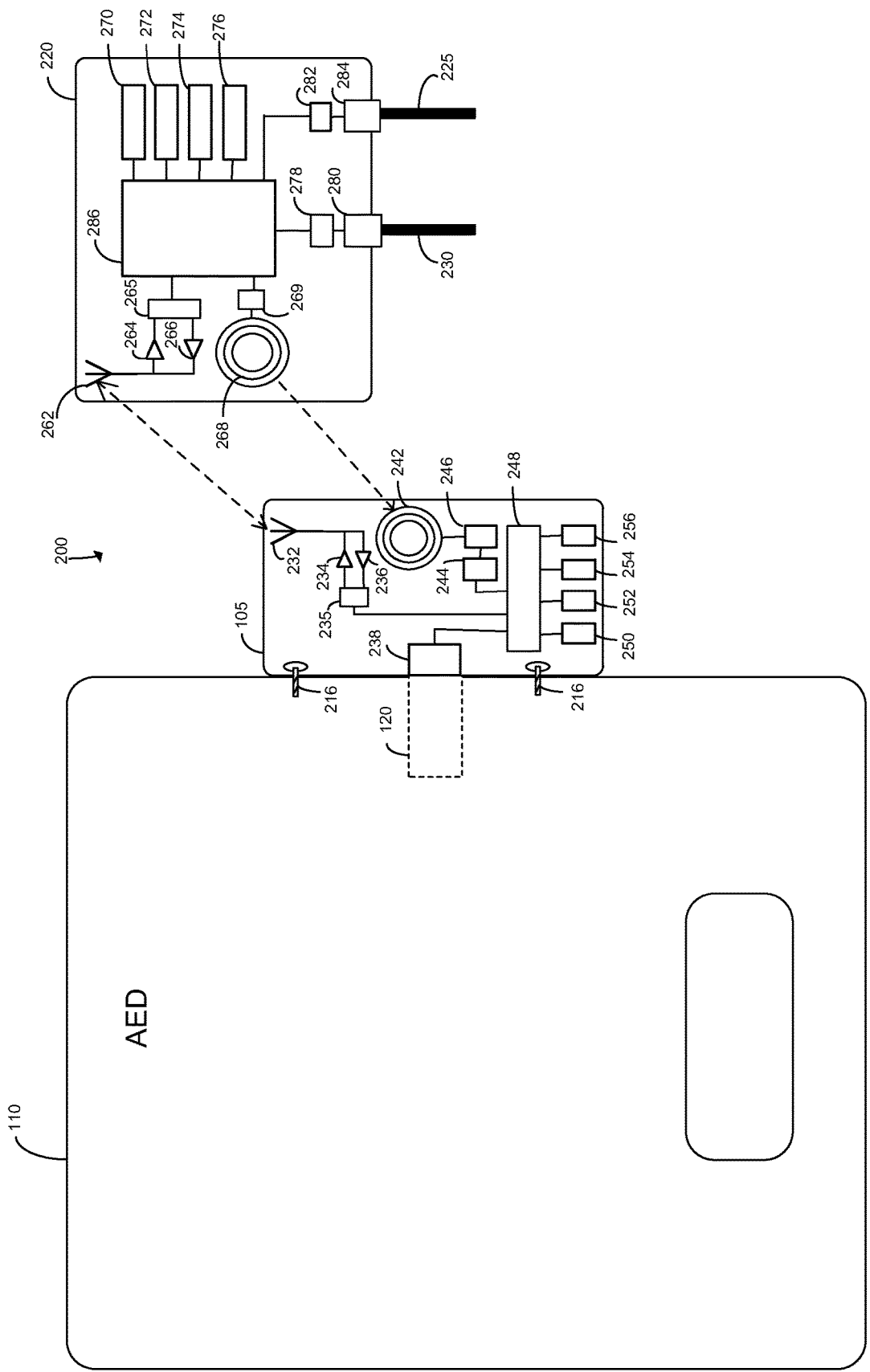
FIG. 3 is a diagram showing a system comprising an interface module coupled with an AED and a wireless dock according to an embodiment of the invention.

FIG. 3 is a diagram showing a system 200 comprising an interface module 105 coupled with an AED 110 and a wireless dock 220 according to an embodiment of the invention. An interface module 105 such as interface module 105 may comprise a processor 248, which may be any type of processor including but not limited to an Intel microprocessor or microcontroller and a memory such as a volatile memory 256 or a non-volatile memory 254, for example, a FLASH memory or electrically erasable programmable read only memory (EEPROM) and/or the like.

Interface module 105 may comprise at least one processor such as processor 248 and at least one other processing component. Processor 248 may comprise circuitry for implementing interface module features such as receiving status information from AED 110, receiving and storing power wirelessly received from wireless dock 220, determining a present location of AED 110, wirelessly transmitting AED status information to wireless dock 220 as well as other interface module functionality. For example, at least one processor 248 may comprise a digital signal processor device, a microprocessor device, a digital to analog converter, other support circuits, and/or the like. Further, the processor 248 may comprise features to operate one or more software programs for implementing interface module 105 functionality.

Volatile memory 256 and/or non-volatile memory 254 may comprise computer program code, which may be configured with processor 248 to execute one or more subroutines to receive status information via communication interface 238 from AED 110 or receive AED software from wireless dock 220 via interface 235. For example, the processor and memory of the removable interface module may be configured to receive software for the AED from the wireless dock via wireless interface 232-262.

Volatile memory 256 may comprise a cache area for the temporary storage of data. Interface module 105 may use memory to store information including computer program code to implement one or more features of interface module 105 including but not limited to receiving status information from AED 110, receiving and storing power wirelessly received from wireless dock 220, determining a present location of AED 110, wirelessly transmitting AED status information to wireless dock 220, receiving AED software from wireless dock 220 as well as other interface module functionality. Volatile memory 256 and/or a non-volatile memory 254 may be removable by a user.

Interface module 105 may comprise a data communication interface 238 such as a serial data interface, parallel data interface, Universal Serial Bus (USB) interface and/or the like including a connector such as connector 120 to allow communication of data with AED110 and to stay physically coupled and electrically connected with the AED especially while the AED is being transported.

In an embodiment, the interface module 105 comprises at least one antenna 232 for communicating with transmitter 234 and receiver 236. Transmitter 234 and/or receiver 236 are coupled with interface 235 to enable processor 248 to communicate wirelessly through antenna 232 with devices such as wireless dock 220. Transmitter 234 and receiver 236 may be packaged as a low-power radio transceiver such as a low-power Bluetooth transceiver and/or an IEEE 802.11 Wireless LAN transceiver. Further, transmitter 234 and/or receiver 236 coupled with interface 235 may be configured to communicate information such as status information and/or location information such as GPS location information with wireless dock 220. The memory and low-power radio transceiver may be communicatively coupled with the processor and configured to receive status information from an AED.

In some embodiments, interface module 105 further comprises a user interface 250, which may include at least one input and/or output device coupled with processor 248 such as but not limited to a display, touch screen, keyboard, keypad, mouse and/or the like. In an embodiment, a display coupled with processor 248 may be capable of displaying status information and/or location information related to AED 110, for example, AED electrode expiration data, AED capacitor discharge data, battery status, GPS location information and/or the like. In some embodiments, user interface 250 may comprise a visual or audible beacon such but not limited to a flashing light or alarm, which may be activated by a data center, network management station, interface module 105 or AED 110, for example.

In some embodiments, a touch screen, keypad, keyboard, buttons and/or other input features may be included on interface module 105 to enable a user to enter data such as query, configuration and/or status information.

In some embodiments, interface module 105 comprises an accelerometer to detect movement of AED 110 and/or interface module 105. Interface module 105 may be configured to wake-up from a sleep mode when accelerometer detects motion of AED 110. In some embodiments, interface module 105 may be configured to send a signal to AED 110 to wake-up or power-on when motion is detected.

In some embodiments, interface module 105 further comprises at least one energy storage device 246, which may be rechargeable such as a rechargeable battery and/or capacitor for providing power to interface module 105. For example, the capacitor may be a super capacitor, which may provide a faster charging time than a battery. In some embodiments, interface module 105 further comprises a wireless power receiver 242 and wireless power controller 244 configured to receive power from a wireless power transmitter such as wireless power transmitter 268 of wireless dock 220. The rechargeable energy storage device may be electrically coupled with the wireless power receiver and configured to receive power wirelessly for the removable interface module.

In some embodiments, wireless power receiver 242 includes Qi-compliant wireless power technology developed by the Wireless Power Consortium (WPC), which was established in 2008. In some embodiments, wireless power receiver 242 may be the bq5101xB WPC 1.1 Compatible Fully Integrated Wireless Power Receiver IC manufactured by Texas Instruments Incorporated. In some embodiments, interface module 105 may receive at least some power from an AED such as AED 110. In other embodiments, interface module 105 receives no power from an AED such as AED 110. In some embodiments, the processor and memory of the interface module are configured to receive status information from the AED without the removable interface module utilizing power from the AED.

Interface module 105 may further comprise a location determining unit 252 for determining the location of AED 110. In some embodiments, location determining unit 252 may comprise a global positioning system (GPS) receiver for receiving a geographic location of AED 110.

A wireless dock such as wireless dock 220 comprises a processor 286, which may be any type of processor including but not limited to an Intel microprocessor or microcontroller and a memory such as a volatile memory 270 or a non-volatile memory 272, for example, a FLASH memory. Further, wireless dock 220 may comprise a plurality of processors and at least one other processing component. Processor 286 may comprise circuitry for implementing one or more wireless dock features. For example, at least one processor 248 may comprise a digital signal processor device, a microprocessor device, a digital to analog converter, other support circuits, and/or the like.

Volatile memory 270 may comprise a cache area for the temporary storage of data. Non-volatile memory 272 may comprise an electrically erasable programmable read only memory (EEPROM), FLASH memory, and/or the like. In an embodiment, wireless dock 220 may use memory to store information including computer program code. Processor 286 coupled with volatile memory 270 and/or non-volatile memory 272 may be configured to implement one or more features of wireless dock 220 including, but not limited to receiving AED information wirelessly from interface module 105, transmitting AED information to an external network element via networking interface 282, providing power to interface module 105 via wireless power transmitter 268 as well as other wireless dock functionality. Volatile memory 270 and/or a non-volatile memory 272 may be removable and/or upgradable by a user.

Wireless dock 220 may comprise a wireless or wired networking interface 282 such as an IEEE 802.11 Wireless LAN interface, cellular interface or Ethernet interface and/or the like, which may include a connector such as Ethernet connector 284 to allow wireless dock 220 to communicate information including software such as AED information with another networked element such as a data center computer via the Internet over Ethernet cable 225, for example. For example, the processor and memory of the wireless dock may be configured to transmit status information to one of a data center and network management station.

The wireless dock 220 may comprise at least one antenna 262 for communicating with transmitter 266 and receiver 264. Transmitter 266 and/or receiver 264 are coupled with an interface 265 to enable processor 286 to communicate wirelessly through antenna 262 with devices such as interface module 105. Transmitter 266 and receiver 264 may be packaged as a low-power radio transceiver such as a low-power Bluetooth transceiver and/or an IEEE 802.11 Wireless LAN transceiver. The memory and low-power radio transceiver may be communicatively coupled with the processor and configured to receive status information from the removable interface module when the AED is powered off and transmit the status information through a networking interface of the wireless dock, for example.

Processor 286 may be configured to provide at least one signal to interface 265 and receive at least one signal from interface 265. Further, transmitter 266 and/or receiver 264 coupled with interface 265 may be configured to transmit and receive information such as status information and/or location information such as GPS location information with interface module 105.

In some embodiments, wireless dock 220 further comprises a user interface 276, which may include at least one input and/or output device coupled with processor 286 such as but not limited to a display, touch screen, keyboard, keypad, mouse and/or the like. In an embodiment, a display coupled with processor 286 may be capable of displaying status information and/or location information related to an AED such as but not limited to AED electrode expiration data, AED capacitor discharge data, battery status, location information and/or the like. In some embodiments, a touch screen, keypad, keyboard, buttons and/or other input features may be included on wireless dock 262 to enable a user to enter data such as query, configuration and/or status information.

In some embodiments, wireless dock 220 further comprises a device management module 274, which allows wireless dock 220 to be managed by a management system over a network such as the Internet using, for example, a Web-based management or Simple Network management Protocol (SNMP). A data center with access to the Internet, for example, may request information from wireless dock 220 via network interface 282. If Web-based management is utilized, wireless dock 220 may further comprise an embedded Web Server, which may respond to Hyper Text Transfer Protocol (HTTP) browser requests for information related to wireless dock 220 and AED 110. A data center may query wireless dock 220 in order to determine status information related to AED 110. Device management module 274 of wireless dock 220 may respond by providing AED 110 status information received from interface module 105 related to AED 110 such as but not limited to data related to the result of the one or more self-tests performed by AED 110, for example.

In some embodiments, wireless dock 220 may comprise a power source interface 280 such as 120 A/C power interface including a transformer to receive and convert A/C power from line 230 to power wireless dock 220. In some embodiments, wireless dock 220 may comprise at least one energy storage device 278 such as but not limited to a rechargeable battery as a backup in case A/C power from line 230 fails for any reason, for example. In some embodiments, wireless dock may receive power from an Ethernet cable such as Ethernet cable 225 using an IEEE Power over Ethernet or Power over Ethernet Plus Standard, for example.

In some embodiments, wireless dock 220 comprises a wireless power transmitter 268 and wireless power controller 269 configured to transmit power to a wireless power receiver such as wireless power receiver 242 of interface module 105. In some embodiments, wireless power transmitter 268 includes Qi-compliant wireless power technology developed by the Wireless Power Consortium (WPC). In some embodiments, wireless power transmitter 268 may be the bq500410A Qi Compliant Free-Positioning Wireless Power Transmitter manufactured by Texas Instruments Incorporated.

In some embodiments, wireless power transmitter is configured to be coupled with a power source such as power source 230 and transmit power wirelessly to the removable interface module when the removable interface module is within range. In some embodiments, the wireless power receiver is configured to receive power wirelessly from the wireless power transmitter and store the power in the rechargeable energy storage device of the removable interface module when the AED is powered off.

An AED such as AED 110 may be stored in an AED cabinet such as AED cabinet 212 or hung on a wall when not in use. An AED may automatically power-on periodically while not in use and execute one or more self-tests. For example, AED 110 may execute one or more diagnostic self-tests which may include testing of one or more internal components such as a capacitor, battery, and/or memory, testing one or more external components such as electrodes and/or testing system functionality such as defibrillation energy delivery levels. In some embodiments, prior to executing one or more self-tests, AED 110 may send a wake-up signal to interface module 105 causing interface module 105 to power-on or wake-up from a sleep mode. In other embodiments, interface module 105 may be configured to power-on or wake-up when interface module 105 detects that AED 110 is on and/or when interface module 105 detects movement, for example, by receiving an indication of movement from an internal accelerometer embedded within interface module 105.

After performing one or more diagnostic self-tests, AED 110 may communicate information such as status information related to one or more self-tests to interface module 105, which may be removably coupled with or permanently integrated into AED 110. Interface module 105 may record the information in an internal memory such as non-volatile memory 254. After interface module 105 has recorded the information received from AED 110, interface module 105 may signal AED 110 that the status information has been stored. AED 110 and/or interface module 105 may then power off to conserve battery power.

AED 110 may repeat the cycle of powering-on, running one or more diagnostic self-tests and sending status information to interface module 105 weekly or monthly, for example. Non-volatile memory 254 may over time comprise a table of status information related to AED 110 including a date/time that the status information was received and/or that at least one self-test related to the status information was executed. Further, if AED 110 comprises location determining functionality, AED may send location information such as map data related to the previous location of AED 110 to interface module 105. In some embodiments, interface module 105 may comprise functionality, for example, a location determining unit 252 for determining one or more locations of AED 110.

In some embodiments, wireless dock 220 may automatically detect by using Qi-compliant wireless power technology whether interface module 105 coupled with AED 110 is within range to communicate with and/or supply power to interface module 105. If wireless dock 220 is not within range of the interface module 105, for example, AED 110 including interface module 105 is not inside the AED cabinet 212 or located on the mounting hook 205, wireless dock 220 may record a time and date that the attempt to communicate with or provide power to interface module 105 occurred. If the wireless dock 220 is within range of interface module 105, the processor and memory of the wireless dock may be configured to cause the removable interface module 105 to power-on by wirelessly transmitting a power-on or wake-up command to interface module 105. Further, wireless dock 220 may provide power to interface module 105 wirelessly and charge energy storage device 246 of interface module 105 using Qi-compliant wireless power technology, for example.

In some embodiments, if AED 110 including interface module 105 are within range of wireless dock 220 and wireless dock 105 detects that interface module 105 has sufficient power, wireless dock 220 may periodically request and receive status information from interface module 105 related to AED 110. One or more requests for status information by wireless dock 220 may be transmitted wirelessly by interface module 105 to wireless dock 220 using a low-power radio transceiver, for example, using transmitter 266 packaged as a transceiver in an integrated circuit and received by receiver 236 of interface module 105 also packaged as a transceiver. Interface module 105 may receive the request and respond by transmitting status information wirelessly to wireless dock 220. Requests for status information from wireless dock 220 to interface module 105 may occur periodically, for example, daily, weekly or monthly.

Wireless dock 220 may transmit status information received from interface 105 to a data center or management station, via the Internet for example, when requested or periodically. In some embodiments, wireless dock 220 may have continuous connectivity with a data center or management station. In some embodiments, data center or a management station may send a request to one or more wireless docks including wireless dock 220, to send status information relating to AED 110. When wireless dock 220 receives the request for AED status information, wireless dock 220 may respond by sending AED status information including data/time information and/or AED location information.

FIG. 4 is a flow diagram depicting a method 400 according to an example embodiment of the invention. At 405, power is received wirelessly from a wireless dock such as wireless dock 220 and stored in a rechargeable energy storage device such as energy storage device 246 of a removable interface module, which is communicatively coupled with an AED. Interface module 105 of FIG. 3 may comprise at least one energy storage device 246 such as a rechargeable battery and/or super capacitor for providing power to interface module 105. Interface module 105 may further comprise a wireless power receiver 242 and wireless power controller 244 configured to receive power from a wireless power transmitter such as wireless power transmitter 268 of wireless dock 220. Power may be received wirelessly from the wireless dock 220 and stored in energy storage device 246 when the AED is either powered-on, powered-off or in a sleep mode. A wireless dock such as wireless dock 220 may receive power from at least one of A/C power source and a battery.

At 410, status information is received from an AED in a memory of a removable interface module. For example, after one or more diagnostic self-tests, AED 110 may communicate information such as status information related to one or more self-tests to interface module 105. Interface module 105 may receive the status information from AED 110 and record the information in an internal memory such as non-volatile memory 254. After interface module 105 has recorded the information received from AED 110, interface module 105 may signal AED 110 that the status information has been stored. AED 110 and/or interface module 105 may then power off to conserve battery power.

At 415, status information is transmitted from a first low-power radio transceiver such as transceiver 234/236 of the removable interface module 105 to a second low-power radio transceiver 264/266 of AED wireless dock 220 when the AED is powered off. Wireless dock 220 may receive status information from interface module 105 related to AED 110, which may be collected over time.

At 420, the status information is transmitted through a networking interface such as networking interface 282 of the wireless dock 220. For example, wireless dock 220 may transmit status information received from interface module 105 to a data center or management station via the Internet when requested or periodically. In some embodiments, wireless dock 220 may have continuous connectivity with a data center or management station.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A system for communicating information including device status information, comprising:
   a removable interface for an automated external defibrillator (AED), the removable interface comprising:
      a first processor, and
      a first memory and a first low-power radio transceiver communicatively coupled with the first processor and configured to, without requiring power from a battery of the AED, receive status information from the AED and send the status information to a dock for the AED, wherein the removable interface is configured to reversibly couple to and decouple from the AED; and
   the dock for the AED, comprising:
      a second processor,
      a second memory and second low-power radio transceiver communicatively coupled with the second processor and configured to receive the status information from the removable interface and transmit the status information through a networking interface to one or more networked elements or computers,
      wherein the dock is physically separate from the removable interface and physically separate from the AED.

2. The system of claim 1, wherein the removable interface is configured to reversibly couple with the AED via a Universal Serial Bus (USB) interface.

3. The system of claim 1, wherein the dock is configured to transmit the status information by the second low-power radio transceiver, through the networking interface of the dock.

4. The system of claim 3, wherein the dock is configured to transmit the status information to at least one of one or more server computers, a data center and a network management station.

5. The system of claim 4, wherein the dock is configured to transmit the status information upon receiving a request from the at least one of the one or more server computers, the data center and the network management station.

6. The system of claim 4, wherein the dock is configured to transmit the status information periodically.

7. The system of claim 3, wherein the networking interface comprises one or more of a local area network interface, a cellular interface and an Ethernet interface.

8. The system of claim 1, wherein the dock k powered by at least one of an A/C power source, an Ethernet cable and the battery.

9. The system of claim 1, wherein the removable interface is configured to receive the power from the dock.

10. The system of claim 1, wherein the removable interface is configured to receive the power from the dock when the AED is powered off for storage in a rechargeable energy storage device of the removable interface.

11. The system of claim 1, wherein the first and second transceivers include Qi-compliant wireless power technology.

12. The system of claim 1, wherein the second transceiver is configured to receive data from the first transceiver.

13. The system of claim 1, wherein the removable interface comprises a location determination unit.

14. The system of claim 13, wherein the location determination unit comprises a global positioning system (GPS) receiver, wherein the GPS receiver configured to receive a location of the AED.

15. The system of claim 13, wherein the removable interface is configured to power on in response to a detection of a movement of the AED.

16. The system of claim 1, wherein the removable interface comprises at least one accelerometer for detection of movement of the AED.

17. The system of claim 1, wherein the status information comprises at least one of: a code event, an amount of energy delivered during a self-test shock, patient information, GPS location information relating to the AED, status of the battery of the AED, and discharge data relating to a capacitor of the AED.

18. The system of claim 1, wherein the status information comprises at least one of: configuration information, troubleshooting information, repair information, and an electrode expiration date.

19. The system of claim 1, wherein the status information comprises self-test diagnostic results of the AED.

20. The system of claim 1, wherein the status information comprises at least one of: a first date and a first time that the status information was received, and a second date and a second time that at least one self-test related to the status information was executed.

21. The system of claim 1, wherein the first processor and first memory are configured to receive software for the AED from the dock.

22. The system of claim 1, wherein the dock is configured to cause the removable interface to power on.

23. A method for communicating information including device status information, comprising:
   receiving, at a removable interface for an automated external defibrillator (AED), status information from the AED without requiring power from a battery of the AED, wherein the removable interface is configured to reversibly couple to and decouple from the AED and comprises a first memory and a first low-power radio transceiver coupled to a first processor;
   transmitting the status information from the removable interface to a dock without requiring the power from the battery of the AED, wherein the dock is physically separate from the removable interface and physically separate from the AED;
   receiving the status information from the removable interface, at the dock, wherein the dock comprises a second memory and a second low-power radio transceiver communicatively coupled to a second processor; and
   transmitting the status information, by the second low-power radio transceiver, through a networking interface of the dock to one or more networked elements or computers.

24. The method of claim 23, comprising receiving, at the removable interface, the status information from the AED, wherein the removable interface is coupled with the AED via a Universal Serial Bus (USB) interface.

25. The method of claim 23, comprising the removable interface receiving the power from the dock.

26. The method of claim 23, comprising the removable interface determining a location of the AED using a global positioning system (GPS) receiver of the removable interface.

27. The method of claim 23, comprising the removable interface detecting movement of the AED using at least one accelerometer of the removable interface.

28. The method of claim 23, comprising the removable interface powering on in response to a detection of a movement of the AED.

29. The method of claim 23, comprising the transmitting of the status information, wherein the status information comprises self-test diagnostic results of the AED.

30. The method of claim 23, comprising the dock causing the removable interface to power on.

* * * * *

UNITED STATES PATENT AND TRADEMARK OFFICE
CERTIFICATE OF CORRECTION

PATENT NO. : 11,108,274 B2
APPLICATION NO. : 16/947170
DATED : August 31, 2021
INVENTOR(S) : Timothy F. Stever et al.

Page 1 of 1

It is certified that error appears in the above-identified patent and that said Letters Patent is hereby corrected as shown below:

In the Claims

Column 11, Line 65, Claim 8, after "dock", delete "k", insert --is--

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*